US007162264B2

(12) United States Patent
Vance

(10) Patent No.: US 7,162,264 B2
(45) Date of Patent: Jan. 9, 2007

(54) TUNABLE PARASITIC RESONATORS

(75) Inventor: Scott L. Vance, Cary, NC (US)

(73) Assignee: Sony Ericsson Mobile Communications AB (SE)

( * ) Notice: Subject to any disclaimer, the term of this patent is extended or adjusted under 35 U.S.C. 154(b) by 241 days.

(21) Appl. No.: 10/684,761

(22) Filed: Oct. 14, 2003

(65) Prior Publication Data

US 2005/0043055 A1 Feb. 24, 2005

Related U.S. Application Data

(60) Provisional application No. 60/493,298, filed on Aug. 7, 2003.

(51) Int. Cl.
*H04M 1/00* (2006.01)

(52) U.S. Cl. .................. 455/550.1; 455/63.4; 455/129; 455/523; 455/575.7; 343/700; 343/702; 343/833; 343/846; 343/848; 343/852; 343/860

(58) Field of Classification Search ............... 455/63.4, 455/129, 550.1, 523, 575.7; 343/700, 702, 343/833, 846, 848, 852, 860
See application file for complete search history.

(56) References Cited

U.S. PATENT DOCUMENTS

| | | | | |
|---|---|---|---|---|
| 4,700,194 | A * | 10/1987 | Ogawa et al. | 343/700 MS |
| 5,966,097 | A * | 10/1999 | Fukasawa et al. | 343/700 MS |
| 5,977,917 | A | 11/1999 | Hirose | 343/702 |
| 6,337,667 | B1 * | 1/2002 | Ayala et al. | 343/795 |
| 6,337,668 | B1 * | 1/2002 | Ito et al. | 343/833 |
| 6,407,710 | B1 * | 6/2002 | Keilen et al. | 343/702 |
| 6,421,016 | B1 * | 7/2002 | Phillips et al. | 343/702 |
| 6,456,249 | B1 * | 9/2002 | Johnson et al. | 343/702 |
| 6,563,467 | B1 * | 5/2003 | Buris et al. | 343/702 |
| 6,639,560 | B1 * | 10/2003 | Kadambi et al. | 343/700 MS |
| 6,839,577 | B1 * | 1/2005 | Krenz et al. | 455/575.7 |
| 6,873,294 | B1 * | 3/2005 | Anderson et al. | 343/702 |
| 6,891,506 | B1 * | 5/2005 | Jarmuszewski et al. | 343/702 |
| 6,909,402 | B1 * | 6/2005 | Vance | 343/702 |
| 6,980,154 | B1 * | 12/2005 | Vance et al. | 343/700 MS |

FOREIGN PATENT DOCUMENTS

| | | | |
|---|---|---|---|
| EP | 1 030 401 A1 | | 8/2000 |
| JP | 1030401 | * | 8/2000 |
| JP | 2002-118414 | | 4/2002 |

OTHER PUBLICATIONS

Sager et al. "A Novel Technique to Increase the Realized Emciency of a Mobile Phone Antenna Placed Beside a Head-phantom" IEEE 2003.*

International Search Report and the Written Opinion of the International Searching Authority, PCT/US2004/016458, mailing date Nov. 25, 2004.

Sager et al. "A Novel Technique to Increase the Realized Efficiency of a Mobile Phone Antenna Placed Beside a Head-Phantom," IEEE 2003.

International Search Report and the Written Opinion of the International Searching Authority, PCT/US2004/016458, mailing date Nov. 25, 2004. (Previously cited in IDS filed Dec. 16, 2004).

* cited by examiner

*Primary Examiner*—Steve M. D'Agosta
(74) *Attorney, Agent, or Firm*—Myers Bigel Sibley & Sajovec

(57) ABSTRACT

A mobile terminal can include a printed circuit board with a reference voltage conductor, an antenna coupled to the first side of the printed circuit board, and a parasitic resonator coupled to the second side of the printed circuit board. More particularly, the parasitic resonator can be connected to the printed circuit board by first and second couplings, which provide first and second impedances, respectively, between the parasitic resonator and the reference voltage conductor. The impedances can be of different values, and can be provided by discrete impedance components. The resonant frequency of the parasitic resonator can be adjusted by altering the impedances of the first and second couplings.

16 Claims, 3 Drawing Sheets

| Overlays | Beam Deg | Peak dB | Series Resistance | Series Inductance |
|---|---|---|---|---|
| Test 1 - - - - | -91.23 | 30.32 | 0Ω | 1nH |
| Test 2 ........ | -89.88 | 31.29 | 22Ω | 1nH |
| Test 3 --·-- | -90.12 | 31.67 | 31Ω | 1nH |
| Test 4 ........ | -91.31 | 31.62 | 62Ω | 1nH |

| | 0 ohms | 22 ohms | 31 ohms | 62 ohms |
|---|---|---|---|---|
| Peak EIRP - Horizontal polarization | 30.22 | 31.28 | 31.82 | 31.54 |
| Ave EIRP - Horizontal polarization | 26.20 | 27.02 | 27.83 | 27.50 |
| Front to back ratio - Peak gain | 2.80 | 2.24 | 1.39 | 1.37 |
| Front to back ratio - Ave gain | 4.90 | 3.34 | 2.36 | 2.22 |

*Chart showing corresponding data from the previous results. Note that between 22 ohms and 62 ohms there are only small deviations in Peak gain, but large changes in average front-to-back ratios.*

FIGURE 5

TUNABLE PARASITIC RESONATORS

RELATED APPLICATION

This application claims priority to Provisional Application No. 60/493,298, filed on Aug. 7, 2003, the contents of which are herein incorporated by reference in their entirety.

FIELD OF THE INVENTION

The present invention relates to mobile terminals, and more particularly, to mobile terminals having parasitic resonators.

BACKGROUND

There is a continuous demand for smaller and yet efficient internal mobile terminal antennas. The Planar Inverted F-Antenna (PIFA) has become a widely used antenna type by several mobile terminal manufacturers. Reasons for such widespread use include design, cost, and mechanical robustness. However, antenna efficiency may be reduced due to radiation levels emitted from the back of the mobile terminal (toward a user holding the mobile terminal to the ear) as compared with the front of the mobile terminal (away from a user holding the mobile terminal to the ear). In the low cellular bands, a major part of this radiation may originate from the ground plane, on a printed circuit board within a housing of a mobile terminal. It has been shown that at 900 MHz, around 90% of the radiation may come from the ground plane.

Certain antenna configurations may be used to increase operating efficiency. One such configuration, for example, is discussed by Mads Sager et al. in "A Novel Technique To Increase The Realized Efficiency Of A Mobile Phone Antenna Placed Beside A Head-Phantom" (IEEE 2003), the disclosure of which is hereby incorporated herein by reference in its entirety. Sager et al. discloses a dual-band PIFA mounted on the backside of a printed circuit board, and a parasitic radiator mounted on the front side of the printed circuit board. The length of the parasitic radiator can be adjusted for reduction of radiation toward the head of the user. However, the length of the parasitic radiator, and thus its maximum effectiveness, may be limited by the physical dimensions of the mobile terminal.

SUMMARY

According to embodiments of the present invention, a mobile terminal may include a printed circuit board having a reference voltage conductor, an antenna coupled to the first side of the printed circuit board, and a parasitic resonator having first and second couplings to the second side of the printed circuit board. The printed circuit board may be located between the antenna and the parasitic resonator. More particularly, the first coupling to the printed circuit board may provide a first impedance between the parasitic resonator and the reference voltage conductor, and the second coupling to the printed circuit board may provide a second impedance between the parasitic resonator and the reference voltage conductor. Moreover, the first and second couplings may provide first and second impedances of different values.

For example, the second coupling may provide a capacitance or inductance between the reference voltage conductor and the parasitic resonator that is greater than the capacitance or inductance provided by the first coupling between the reference voltage conductor and the parasitic resonator. More particularly, the first coupling may provide an electrical 1 short between the parasitic resonator and the reference voltage conductor, and the second coupling may provide a capacitance and/or inductance between the reference voltage conductor and the parasitic resonator.

Also, at least one of the first and second couplings may include a discrete impedance element. For example, the discrete impedance element may be at least one of a discrete capacitor, a discrete inductor, and/or a discrete resistor. More particularly, each of the first and second couplings may include such discrete impedance elements. In addition, the discrete impedance element may be soldered on the printed circuit board.

According to additional embodiments of the present invention, a mobile terminal may include a printed circuit board having a reference voltage conductor, an antenna coupled to the first side of the printed circuit board, and a parasitic resonator having first and second couplings to the second side of the printed circuit board. The printed circuit board may be located between the antenna and the parasitic resonator. More particularly, at least one of the first and second couplings may include a discrete impedance element between the parasitic resonator and the reference voltage conductor.

For example, the discrete impedance element may be at least one of a discrete capacitor, a discrete inductor, and/or a discrete resistor. More particularly, each of the first and second couplings may include such discrete impedance elements between the parasitic resonator and the reference voltage conductor. In addition, the discrete impedance element may be soldered on the printed circuit board.

Also, the first coupling to the printed circuit board may provide a first impedance between the parasitic resonator and the reference voltage conductor, and the second coupling to the printed circuit board may provide a second impedance between the parasitic resonator and the reference voltage conductor. Moreover, the first and second impedances may have different values. For example, the second coupling may provide a capacitance or inductance between the reference voltage conductor and the parasitic resonator that is greater than the capacitance or inductance provided by the first coupling between the reference voltage conductor and the parasitic resonator. More particularly, the first coupling may provide an electrical short between the parasitic resonator and the reference voltage conductor, and the second coupling may provide a capacitance and/or inductance between the reference voltage conductor and the parasitic resonator.

BRIEF DESCRIPTION OF THE DRAWINGS

FIG. 5 is a chart illustrating characteristics of examples of particular serially coupled impedance elements according to embodiments of the present invention.

DETAILED DESCRIPTION

Figure 1A:
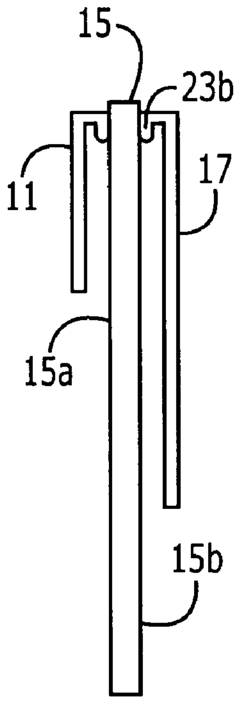
FIG. 1A is an edge view taken along a lengthwise direction illustrating a parasitic resonator, a printed circuit board, and a PIFA according to embodiments of the present invention.

The present invention will now be described more fully hereinafter with reference to the accompanying drawings, in which embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the dimensions of various elements may be exaggerated for clarity. It will also be understood that when an element is referred to as being "coupled" or "connected" to another element, it can be directly coupled or connected to the other element, or intervening elements may also be present. Similarly, when an element is referred to as being "on" another element, it can be directly on the other element, or intervening elements may also be present. Like numbers refer to like elements throughout. This disclosure also uses relative terms, such as "side", "front", "back", "top", and/or "bottom" to describe some of the elements in the embodiments. These relative terms are used for the sake of convenience and clarity when referring to the drawings, but are not to be construed to mean that the elements so described can only be positioned relative to one another as shown.

A front-to-back ratio is a ratio of radiation out of a front of an antenna of a mobile terminal (away from a user holding the mobile terminal to the ear) with respect to radiation out of a back of the antenna of the mobile terminal (toward a user holding the mobile terminal to the ear). When discussed in the context of antenna design, the "front" of a mobile terminal is the side with the antenna, and the "back" is the side including the earpiece that is held to the user's ear when talking. The front-to-back ratio may be improved by providing metallization of the housing of the mobile terminal, along with a single or multiple contact points to a reference voltage conductor (such as a ground plane); by providing a metal carrier that is grounded in multiple locations; and/or by providing a metal ring around the liquid crystal display (wherein the metal ring may be provided as a foil) with contact to the ring in single or multiple locations.

Metallization of the housing of a mobile terminal may be relatively expensive (in the range of approximately $0.40–$0.70 for a typical product). Moreover, there may be yield and/or repeatability issues in the application of metallization to the housing of a mobile terminal, and process stability may also be a concern. Metal carriers may be made of stainless steel which may be a relatively poor conductor, which may be relatively expensive (approximately $0.30), and which may increase a thickness of the resulting product by 0.15–0.3 mm.

A metal ring around a liquid crystal display (LCD) of a mobile terminal can be effective. A cost increase over a typical dust gasket may be on the order of $0.05 for a metal ring. Moreover, improvements in the front-to-back ratio can be significant depending on the implementation. When a metal ring is implemented incorrectly, however, main antenna gain may decrease. In addition, an effectiveness of a metal ring may depend on the resonance of the metal ring around the LCD, which in turn may depend on the size of the LCD. Use of a metal ring as a parasitic radiator is discussed, for example, by Mads Sager et al. in "A Novel Technique To Increase The Realized Efficiency Of A Mobile Phone Antenna Placed Beside A Head-Phantom" (IEEE 2003), the disclosure of which is hereby incorporated herein by reference in its entirety.

A mobile terminal (such as a radiotelephone) may use a conductive gasket and/or ring around the liquid crystal display (LCD) with single or multiple contact points to reduce radiation levels towards the user's head. For example, 4 contact points may be provided at corners of the gasket around the LCD, with the contact points providing contact between the metal gasket and a ground plane of a printed circuit board (PCB) used in the mobile terminal. In alternative approaches, one contact point between the metal gasket and the PCB may be used, or two contact points may be used. More particularly, dual contacts may be used with the contact points being placed adjacent the top left and right corners of the LCD.

A mobile terminal may include a printed circuit board therein, on which electronic components of the mobile terminal are mounted. As will be understood by those having skill in the art, a printed circuit board may include a plurality of patterned conductive layers separated by insulating layers with conductive vias through the insulating layers providing interconnections between the patterned conductive layers. Electronic components may be mounted on one or both sides of the printed circuit board with leads (such as surface mount leads, dual-in-line package leads, and/or ball grid array leads) of the electronic components providing electrical and/or mechanical interconnect of the electronic components and conductive layers of the printed circuit board. Electronic components mounted on the printed circuit board may include integrated circuits such as processors, memories, logic devices, power devices, and/or analog devices; discrete devices such as resistors, capacitors, and/or inductors; transducers such as speakers and/or microphones; and/or a keypad and/or display interface.

More particularly, the printed circuit board of a mobile terminal may include a reference voltage conductor, which may be maintained at a reference voltage during operation of the mobile terminal. The reference voltage conductor may be maintained at a ground voltage for the mobile terminal during operation and is commonly referred to as a ground plane.

Figure 1B:
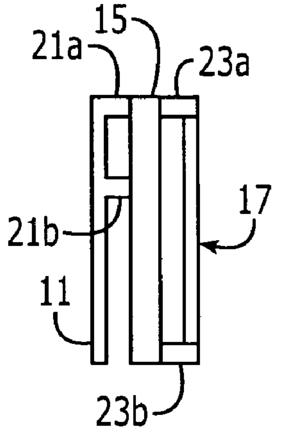
FIG. 1B is a top view taken along a width direction illustrating a parasitic resonator, a printed circuit board, and a PIFA according to embodiments of the present invention.

According to some embodiments of the present invention, a mobile terminal may include an antenna 11 proximate to a first side 15*a* of a printed circuit board 15 and coupled thereto, and a parasitic resonator 17 (also referred to as a parasitic radiator) proximate to a second side 15*b* of the printed circuit board and coupled thereto, as illustrated in FIGS. 1A and 1B. The edge view of FIG. 1A is taken along a lengthwise direction L of the printed circuit board 15 with the antenna 11 and the parasitic resonator 17 being coupled near an end thereof. The top view of FIG. 1B is taken along a width direction W of the printed circuit board 15 at the end near the coupling of the antenna 11 and the printed circuit board 15.

The second side 15*b* of the printed circuit board 15 may be adjacent a microphone, a speaker, a liquid crystal display, and/or a keypad. Accordingly, the parasitic resonator 17 may be between a users head and the printed circuit board 15 when the user is talking on the mobile terminal, and the printed circuit board 15 may be between the antenna 11 and the user's head when talking. Moreover, a speaker of the mobile terminal may be located relatively near a coupling of the parasitic resonator 17 and the printed circuit board 15, and a microphone may be located relatively far from the coupling of the parasitic resonator 17 and the printed circuit board 15. The microphone and speaker may thus be between the printed circuit board 15 and the user's head when the user is talking on the mobile terminal.

More particularly, the printed circuit board 15, the antenna 11, and the parasitic resonator 17 may be enclosed within a mobile terminal housing with the parasitic resonator 17 being between the printed circuit board 15 and a first face of the housing and with the antenna 11 being between the printed circuit board 15 and a second face of the housing. Moreover, a speaker and a liquid crystal display may be provided between the printed circuit board 15 and the first face of the mobile terminal so that the speaker and the first face of the mobile terminal housing are held to the ear of a user when using the phone. In addition, the parasitic resonator 17 may be provided as a metal foil on a dust gasket provided around the liquid crystal display. A conventional parasitic radiator provided as a foil within a mobile terminal housing is illustrated, for example, in the reference by Mads Sager et al. entitled "A Novel Technique To Increase The Realized Efficiency Of A Mobile Phone Antenna Placed Beside a Head-Phantom" (IEEE, 2003). A parasitic resonator according to embodiments of the present invention may be provided as a foil and housed in a mobile terminal in place of the conventional parasitic resonator illustrated in the reference by Mads Sager et al.

The antenna 11 may be a planar inverted F antenna (PIFA) with two electrical couplings to the printed circuit board 15. As will be understood by those having skill in the art, a planar inverted F antenna may not be entirely planar. For example, a planar inverted F antenna may be planar or flat, or may instead conform to a housing of the mobile terminal. More particularly, the antenna 11 may have a first electrical coupling 21*a* to a signal line of the printed circuit board, and a second electrical coupling 21*b* to the reference voltage conductor of the printed circuit board 15.

The parasitic resonator 17 may be a ring with two electrical couplings to the printed circuit board 15. More particularly, the parasitic resonator 17 may have a first electrical coupling 23*a* directly coupled to the reference voltage conductor of the printed circuit board 15, and a second electrical coupling 23*b* coupled to the reference voltage conductor of the printed circuit board 15 through one or more of a resistance, a capacitance, and/or an inductance. Stated in other words, a first impedance may be provided between the first electrical coupling 23*a* and the reference voltage conductor, and a second impedance (different than the first impedance) may be provided between the second electrical coupling 23*b* and the reference voltage conductor. For example, the first impedance may be provided by a short circuit, and the second impedance may be provided by one or more of a discrete resistor, capacitor, and/or inductor. In an alternative, both of the electrical couplings 23*a* and 23*b* may be coupled to the reference conductor through one or more impedance elements such as discrete impedance elements provided on the printed circuit board such as by soldering.

Figure 2:
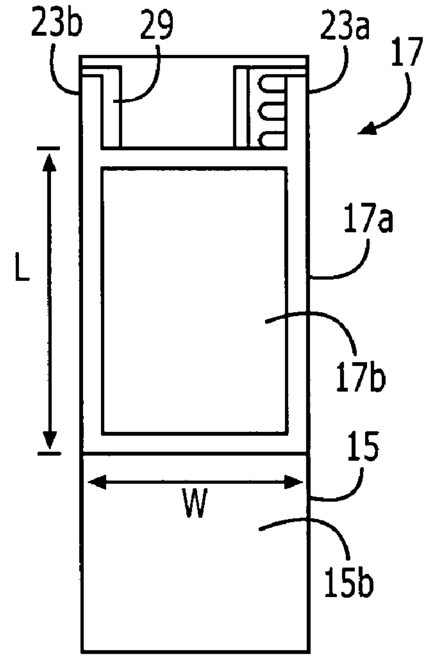
FIG. 2 is a plan view illustrating a parasitic resonator and a PIFA according to some embodiments of the present invention.

As shown in the plan view of FIG. 2, the parasitic resonator 17 may include a ring 17*a* having an opening 17*b* therein. More particularly, the ring 17*a* may be configured to surround a display of the mobile terminal such as a liquid crystal display (LCD). Accordingly, allowable geometries of the ring may be constrained by a geometry of the LCD and/or dimensions of the mobile terminal housing.

As discussed above, a front-to-back ratio is the ratio of radiation out the front of the antenna (away from a user holding the phone to the ear) with respect to radiation out of the back of the antenna (toward the user holding the phone to the ear). When discussed in the context of antenna design, the "front" of a mobile terminal is the side with the antenna. A front-to-back ratio of 2 dB would, thus, mean that the peak radiation away from the user's head was 2 dB higher than that towards the head. It is useful to have a front-to-back ratio of about 1–4 dB to increase efficiency of the antenna (so that more radiation is transmitted away from the user).

The ability of a two-contact parasitic resonator 17 to impact front-to-back ratio is dependent on the radiant nature of the structure. The parasitic resonator 17 can be made to resonate at the frequency where the radiation is to be altered (for example, at approximately 900 MHz). By doing so, the front to back ratio can be improved from about 0 dB to 2–4 dB or more. The peak gain of the main radiator (i.e. antenna 11), however, may also be reduced. Tuning of the parasitic resonator 17 may be achieved based on the geometry of the parasitic resonator 17. As discussed above, however, allowable geometries of the parasitic resonator 17 may be constrained by dimensions of a liquid crystal display around which the parasitic resonator 17 is provided, dimensions of a housing of the mobile terminal, etc.

The parasitic resonator may also be tuned using matching components (such as capacitive, and/or inductive components) to tune the parasitic radiator. In addition, a series resistance may be used to provide improvements in the front-to-back ratio without significantly degrading the overall gain of the antenna 11. A systematic method may also be used to determine appropriate matching elements for a given geometry of the parasitic resonator 17.

Figure 3:
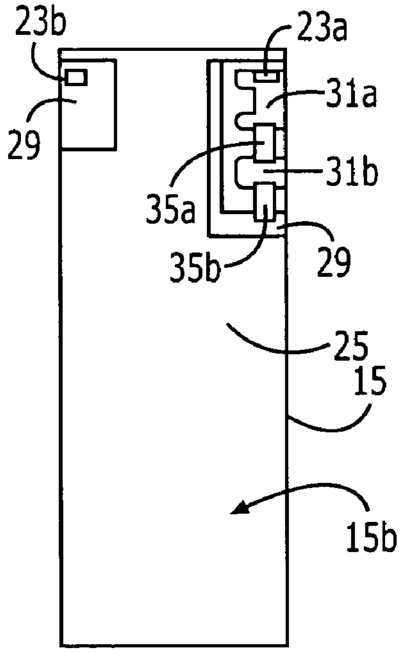
FIG. 3 is a partial plan view illustrating a printed circuit board according to some embodiments of the present invention.

As discussed above, the parasitic resonator 17 may have first and second electrical couplings 23*a* and 23*b* providing electrical and mechanical coupling to the printed circuit board 15. FIG. 3 illustrates a partial plan view of the second side 15*b* of the printed circuit board. As shown in FIG. 3, the printed circuit board 15 may include a patterned insulating layer 25 on the second side 15*b* thereof. Moreover, patterning of the insulating layer 25 may expose portions of other insulating and conductive layers of the printed circuit board. More particularly, the insulating layer 25 may be patterned so that portions of a reference voltage conductor 29 (such as a ground plane) are exposed. The reference voltage conductor 29, for example, may be patterned from a single conductive layer of the printed circuit board, and portions of the conductive layer used to provide the reference voltage conductor 29 may be patterned to provide one or more contact pads 31*a* and 31*b* separate from the reference voltage conductor 29.

Accordingly, the electrical coupling 23*b* from the parasitic resonator 17 may be directly coupled to an exposed portion of the reference voltage conductor 29 to provide an electrical short between the parasitic resonator 17 and the reference voltage conductor 29 through the electrical coupling 23*b*. The electrical coupling 23*b* from the parasitic resonator 17 may be coupled to the contact pad 31*a*. Impedance elements 35*a* and 35*b* may provide a serial coupling from the contact pad 31*a* through impedance element 35*a* to contact pad 31*b*, and from contact pad 31*b* through impedance element 35*b* to reference voltage conductor 29. The impedance elements may be selected from one or more of resistive, capacitive, and/or inductive elements. According to a particular example, a first impedance element may be a resistor, and a second impedance element may be one of a capacitor or an inductor.

While two serially coupled impedance elements are illustrated in FIG. 3, more or fewer impedance elements may be used as matching elements according to embodiments of the present invention. Moreover, couplings other than serial couplings may be used. For example, the electrical coupling 23*a* may be coupled with reference voltage conductor 29 using a π network(s) and/or a T network(s). The impedance elements 35*a* and/or 35*b*, for example, may be discrete surface mount components that are soldered to the contact pads. In an alternative, one or both of the impedance elements 35*a* and/or 35*b* may be provided using different geometries of patterned conductive layers in the printed circuit board 15. In another alternative, an impedance element(s) may also or in an alternative be provided between the electrical coupling 23*b* and the reference voltage conductor 29.

Matching components can, thus, be used to tune the parasitic resonator 17 according to embodiments of the present invention. By adding either capacitive and/or inductive elements in series, the resonant frequency of the parasitic resonator 17 can be raised or lowered. In order to achieve an increased front-to-back ratio, the parasitic resonator 17 may be tuned to the desired resonance frequency. Tuning may be accomplished in some embodiments of the present invention with a single series impedance element at one or more of the contacts from the parasitic resonator 17. For cost reasons, it may be advantageous to use a single capacitive and/or inductive element. Moreover, a resistive element may be provided in series with one or both of a capacitive and/or inductive element.

By using two or more impedance elements in series as illustrated in FIG. 3, a front-to-back ratio may be improved while maintaining a desired gain from the antenna 11. The use of series elements in addition to those elements used for matching may provide a predictable decrease in the gain of the parasitic resonator. An experiment with series resistors may demonstrate that the parasitic resonator 17 could be made lossy allowing control of the front-to-back ratio and the overall gain. With a relatively large value resistor (1K Ohm) used for one of the impedance elements 35*a* or 35*b*, peak radiation from the antenna 11 may be relatively high, but front-to-back ratio may be relatively poor (~0 dB). With smaller value resistors (for example, 27 Ohms) used for one of the impedance elements 35*a* or 35*b*, peak radiation may be reduced, but the front-to-back ratio may be relatively good (~2 dB). With lower value resistors (for example, 0 ohms) used for one of the impedance elements 35*a* or 35*b*, the front to back ratio may increase further (for example, 3 dB or more), but the overall peak gain may drop by 1 dB or more. By selecting intermediate values, it may be possible to get different levels of peak radiation and radiation patterns.

According to embodiments of the present invention, methods may be provided for systematically tuning the parasitic resonator. To make the parasitic resonator radiate more effectively, the parasitic resonator may be placed in a ring around an upper part of the phone where the LCD may be situated. According to particular embodiments of the present invention, the parasitic resonator may be isolated from other pieces of metal in the mobile terminal by 0.2 mm or more (for example, 3 mm may be preferred). The contacts of the parasitic resonator should be relatively low-resistance when they are attached to the PCB.

By placing a relatively large-bandwidth antenna on structures according to embodiments of the present invention, the resonance of the parasitic resonator 17 may be determined visually using a network analyzer. In an alternative embodiment, matching elements can be sequentially placed in series between the reference voltage conductor and one of the contacts from the parasitic resonator, and the gain of the antenna may be measured with each matching element. For example, each of a 5 nH inductor, a 0 ohm resistor, and a 2 pF capacitor may be separately placed in series between the reference voltage conductor and one of the contacts from the parasitic resonator, and the gain of the antenna may be measured with each element. If the initial structure is close to the resonance of the desired frequency when gain measurements are taken, a change in gain may be noticed depending on the matching elements used. Matching elements may be changed until a suitably low gain is achieved. A desired lowest gain may correspond to a resonance frequency of the parasitic resonator and to a greatest front-to-back ratio. At this point, resistance element(s) (for example, element 35*a*) may be introduced in series with the matching element(s) (for example, element 35*b*) to provide a desired gain and front-to-back ratio.

For particular applications according to embodiments of the present invention, a high front-to-back ratio may be more important at low-band (for example, at frequencies in the range of approximately 824–960 MHz) than at high-band (for example at frequencies in the range of approximately 1710–1990 MHz). This is because the front-to-back ratio at high-band may be primarily a function of feed location and antenna design. At low-band, the front-to-back ratio may be more difficult to control via antenna design, especially on systems where the size of the PCB is small relative to the wavelength in question. Accordingly, a parasitic resonator according to embodiments of the present invention may be designed to resonate at the low-band. The structure may also resonate at the high-band, and may result in a slightly improved impedance match at these higher frequencies.

According to some embodiments of the present invention, the parasitic resonator may be formed of a relatively good conductor such as copper or aluminum. Other materials, such as stainless steel, may also be used (in addition or in an alternative). When the resonance frequency of the structure is significantly different than that of the frequency in question, more advanced matching circuits such as T networks and/or PI (π) networks may be used. The use of T and/or π networks, for example, may be used on mobile terminals where dimensions of the LCD are larger than ~40 mm×~40 mm.

Figure 4:
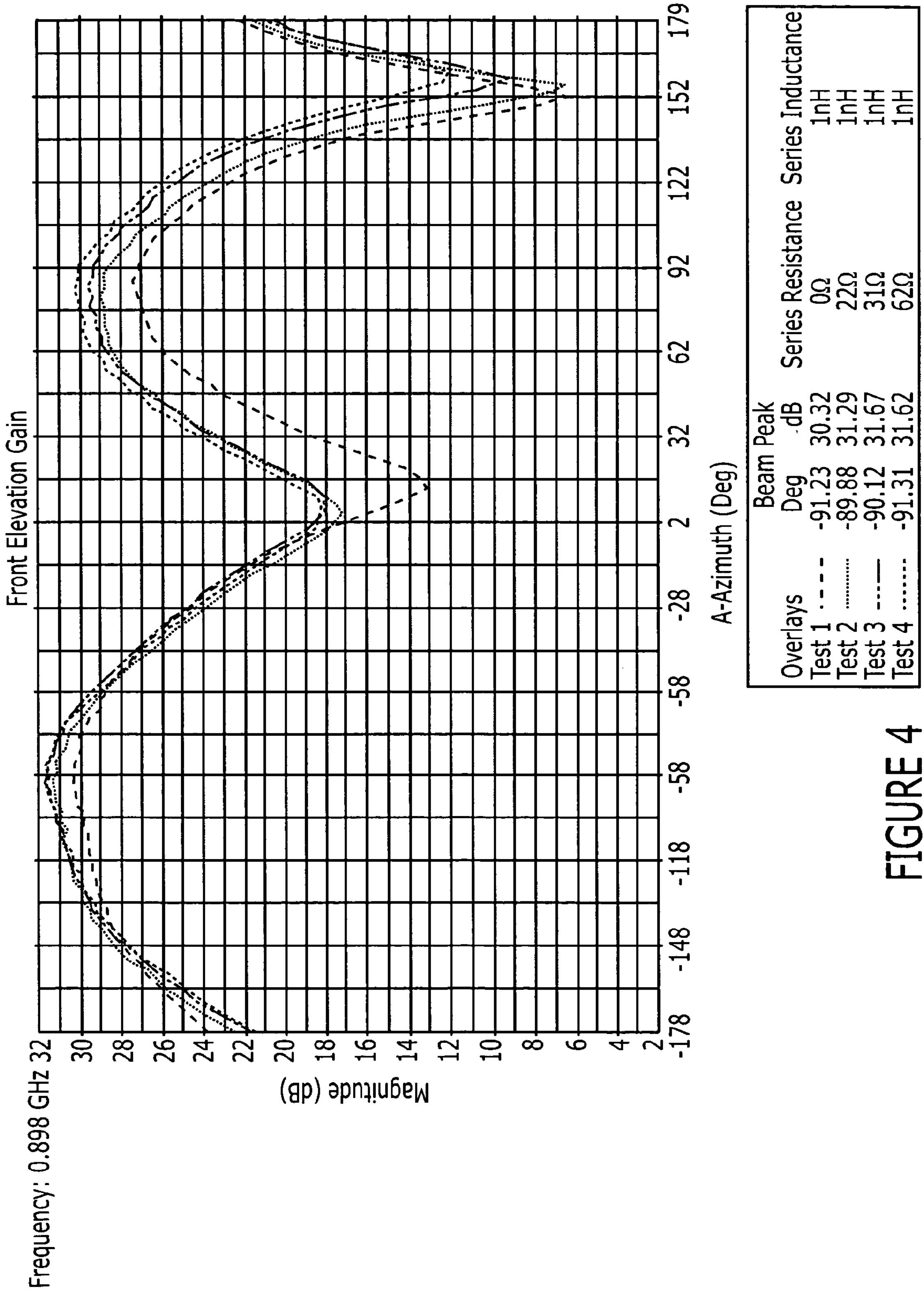
FIG. 4 is a graph illustrating characteristics of examples of particular serially coupled impedance elements and PIFAs according to embodiments of the present invention.

FIGS. 4 and 5 illustrate characteristics of examples of particular serially coupled impedance elements according to embodiments of the present invention for an antenna operating at approximately 900 MHz. In particular, the coupling 23*b* of the parasitic resonator 17 is directly coupled to the reference voltage conductor 29 to provide a short circuit therebetween, and the coupling 23*a* of the parasitic resonator 17 is coupled with the reference voltage conductor 29 through a series coupling of a 1 nH inductor and one of four resistors (0 ohm, 22 ohm, 31 ohm, and 62 ohm). The results using each resistor are illustrated in the graph of FIG. 4, and in the chart of FIG. 5. In the graph of FIG. 4, positive 90 degrees references a direction toward the ear of a user holding the mobile terminal to the ear, negative 90 degrees references a direction away from the ear of a user holding the mobile terminal to the ear, 0 degrees references a direction out of the top of the mobile terminal (an end of the mobile terminal near the antenna 11), and positive and negative 180 degrees reference a direction out of the bottom of the mobile terminal (an end of the mobile terminal distant from the antenna 11). Moreover, the data of FIG. 4 was taken using a parasitic resonator having a rectangular ring with a length wise dimension L (shown in FIG. 2) of approximately 30 mm, a width dimension W (shown in FIG. 2) of approximately 36 mm, and arms for couplings 23*a* and 23*b* of approximately 12 mm length (including the bend to provide coupling to the printed circuit board). The chart of FIG. 5 shows corresponding data from the graph of FIG. 4. In particular, note that between 22 ohms and 62 ohms there are only relatively small deviations in peak gain, but relatively large changes in average front-to-back ratios.

According to additional embodiments of the present invention, the parasitic resonator 17 may have dimensions as discussed above with respect to FIGS. 4 and 5. For a mobile terminal operating at frequencies in the range of approximately 880 MHz to 960 MHz, a 1.8 nH inductor and a 68 ohm resistor can be serially coupled between one coupling of the parasitic resonator and the reference voltage conductor. For a mobile terminal operating at frequencies in the range of approximately 824 MHz to 894 MHz, a 3.3 nH inductor and a 47 ohm inductor can be serially coupled between one coupling of the parasitic resonator and the reference voltage conductor.

While particular embodiments of parasitic resonators are illustrated in FIGS. 1A, 1B, 2, and 3, it will be understood that modifications of the illustrated resonators are contemplated according to embodiments of the present invention. For example, one or more breaks may be provided in the ring 17*a* such as at null points thereof. Moreover, geometries other than rectangular may be used. In addition, while components other than the antenna 11, parasitic resonator 17, and impedance elements 35*a* and 35*b* are not shown on the printed circuit board 15 for the sake of clarity, it will be understood that any number of other components may be provided on one or both sides of the printed circuit board.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A mobile terminal, comprising:

a printed circuit board having first and second opposite sides and having a reference voltage conductor therein;

an antenna coupled to the first side of the printed circuit board; and a parasitic resonator having first and second couplings to the second side of the printed circuit board wherein the printed circuit board and the first and second opposite sides thereof are between the antenna and the parasitic resonator, wherein the first coupling to the printed circuit board provides a first impedance between the parasitic resonator and the reference voltage conductor, wherein the second coupling to the printed circuit board provides a second impedance between the resonator and the reference voltage conductor wherein the first and second impedances are different, and wherein the second coupling provides a capacitance between the reference voltage conductor and the parasitic resonator that is greater than a capacitance provided by the first coupling between the reference voltage conductor and the parasitic resonator.

2. A mobile terminal according to claim 1 wherein the first coupling provides an electrical short between the parasitic resonator and the reference voltage conductor.

3. A mobile terminal according to claim 1 wherein at least one of the first and second couplings comprises a discrete impedance element between the parasitic resonator and the reference voltage conductor.

4. A mobile terminal according to claim 3 wherein the discrete impedance element comprises at least one of a discrete capacitor, a discrete inductor, and/or a discrete resistor.

5. A mobile terminal according to claim 4 wherein the discrete impedance element is soldered on the printed circuit board.

6. A mobile terminal according to claim 3 wherein each of the first and second couplings comprises a discrete impedance element between the parasitic resonator and the reference voltage conductor.

7. A mobile terminal, comprising:

a printed circuit board having first and second opposite sides and having a reference voltage conductor therein;

an antenna coupled to the first side of the printed circuit board; and a parasitic resonator having first and second couplings to the second side of the printed circuit board wherein the printed circuit board and the first and second opposite sides thereof are between the antenna and the parasitic resonator, wherein the first coupling to the printed circuit board provides a first impedance between the parasitic resonator and the reference voltage conductor, wherein the second coupling to the printed circuit board provides a second impedance between the resonator and the reference voltage conductor wherein the first and second impedances are different, and wherein the second coupling provides an inductance between the reference voltage conductor and the parasitic resonator that is greater than an inductance provided by the first coupling between the reference voltage conductor and the parasitic resonator.

8. A mobile terminal, comprising:

a printed circuit board having first and second opposite sides and having a reference voltage conductor therein;

an antenna coupled to the first side of the printed circuit board; and a parasitic resonator having first and second couplings to the second side of the printed circuit board wherein the printed circuit board and the first and second opposite sides thereof are between the antenna and the parasitic resonator, wherein at least one of the first and second couplings to the printed circuit board comprises a discrete impedance element between the parasitic resonator and the reference voltage conductor, wherein the first coupling to the printed circuit board provides a first impedance between the parasitic resonator and the reference voltage conductor, wherein the second coupling to the printed circuit board provides a second impedance between the resonator and the reference voltage conductor wherein the first and second impedances are different, and wherein the second coupling provides a capacitance between the reference voltage conductor and the parasitic resonator that is greater than a capacitance provided by the first coupling between the reference voltage conductor and the parasitic resonator.

9. A mobile terminal according to claim 8 wherein the discrete impedance element comprises at least one of a discrete capacitor, a discrete inductor, and/or a discrete resistor.

10. A mobile terminal according to claim 9 wherein the discrete impedance element is soldered on the printed circuit board.

11. A mobile terminal according to claim 8 wherein each of the first and second couplings comprises a discrete impedance element between the parasitic resonator and the reference voltage conductor.

12. A mobile terminal according to claim 8 wherein the first coupling provides an electrical short between the parasitic resonator and the reference voltage conductor.

13. A mobile terminal, comprising:

a printed circuit board having first and second opposite sides and having a reference voltage conductor therein;

an antenna coupled to the first side of the printed circuit board; and a parasitic resonator having first and second couplings to the second side of the printed circuit board wherein the printed circuit board and the first and second opposite sides thereof are between the antenna and the parasitic resonator, wherein at least one of the first and second couplings to the printed circuit board comprises a discrete impedance element between the parasitic resonator and the reference voltage conductor, wherein the first coupling to the printed circuit board provides a first impedance between the parasitic resonator and the reference voltage conductor, wherein the second coupling to the printed circuit board provides a second impedance between the resonator and the reference voltage conductor wherein the first and second impedances are different, and wherein the second coupling provides an inductance between the reference voltage conductor and the parasitic resonator that is greater than an inductance provided by the first coupling between the reference voltage conductor and the parasitic resonator.

14. A mobile terminal, comprising:

a printed circuit board having first and second opposite sides and having a reference voltage conductor therein;

an antenna coupled to the first side of the printed circuit board; and a parasitic resonator having first and second couplings to the second side of the printed circuit board wherein the printed circuit board and the first and second opposite sides thereof are between the antenna and the parasitic resonator, wherein the first coupling to the printed circuit board provides a first impedance between the parasitic resonator and the reference voltage conductor, wherein the second coupling to the printed circuit board provides a second impedance between the resonator and the reference voltage conductor wherein the first and second impedances are different, wherein the first coupling provides an electrical short between the parasitic resonator and the reference voltage conductor, wherein the second coupling provides at least one of a capacitance and/or an inductance between the reference voltage conductor and the parasitic resonator, wherein the second coupling comprises a discrete impedance element between the parasitic resonator and the reference voltage conductor, wherein the discrete impedance element comprises at least one of a discrete capacitor, a discrete inductor and/or a discrete resistor, and wherein the discrete impedance element is soldered on the printed circuit board.

15. A mobile terminal, comprising:

a printed circuit board having first and second opposite sides and having a reference voltage conductor therein;

an antenna coupled to the first side of the printed circuit board; and a parasitic resonator having first and second couplings to the second side of the printed circuit board wherein the printed circuit board and the first and second opposite sides thereof are between the antenna and the parasitic resonator, wherein the first coupling to the printed circuit board provides a first impedance between the parasitic resonator and the reference voltage conductor, wherein the second coupling to the printed circuit board provides a second impedance between the resonator and the reference voltage conductor wherein the first and second impedances are different, wherein at least one of the first and second couplings comprises a discrete impedance element between the parasitic resonator and the reference voltage conductor, wherein the discrete impedance element comprises at least one of a discrete capacitor, a discrete inductor, and/or a discrete resistor, wherein the discrete impedance element is soldered on the printed circuit board, and wherein the second coupling provides a capacitance between the reference voltage conductor and the parasitic resonator that is greater than a capacitance provided by the first coupling between the reference voltage conductor and the parasitic resonator.

16. A mobile terminal, comprising:

a printed circuit board having first and second opposite sides and having a reference voltage conductor therein;

an antenna coupled to the first side of the printed circuit board; and a parasitic resonator having first and second couplings to the second side of the printed circuit board wherein the printed circuit board and the first and second opposite sides thereof are between the antenna and the parasitic resonator, wherein the first coupling to the printed circuit board provides a first impedance between the parasitic resonator and the reference voltage conductor, wherein the second coupling to the printed circuit board provides a second impedance between the resonator and the reference voltage conductor wherein the first and second impedances are different, wherein at least one of the first and second couplings comprises a discrete impedance element between the parasitic resonator and the reference voltage conductor, wherein the discrete impedance element comprises at least one of a discrete capacitor, a discrete inductor, and/or a discrete resistor, wherein the discrete impedance element is soldered on the printed circuit board, and wherein the second coupling provides an inductance between the reference voltage conductor and the parasitic resonator that is greater than an inductance provided by the first coupling between the reference voltage conductor and the parasitic resonator.

* * * * *